United States Patent
Plaindoux et al.

(10) Patent No.: US 9,346,994 B2
(45) Date of Patent: May 24, 2016

(54) HEAT-PROTECTION MATERIAL

(75) Inventors: Cédric Plaindoux, Bordeaux (FR); Jean-Marc Bouilly, Saint Medard en Jalles (FR)

(73) Assignee: AIRBUS DEFENCE & SPACE SAS, Les Mureaux (FR)

( * ) Notice: Subject to any disclaimer, the term of this patent is extended or adjusted under 35 U.S.C. 154(b) by 0 days.

(21) Appl. No.: 13/642,821

(22) PCT Filed: Apr. 19, 2011

(86) PCT No.: PCT/EP2011/056271
§ 371 (c)(1),
(2), (4) Date: Apr. 29, 2013

(87) PCT Pub. No.: WO2011/131694
PCT Pub. Date: Oct. 27, 2011

(65) Prior Publication Data
US 2013/0207027 A1 Aug. 15, 2013

(30) Foreign Application Priority Data
Apr. 22, 2010 (FR) .................................... 10 53089

(51) Int. Cl.
| C08L 97/00 | (2006.01) |
| C08L 61/06 | (2006.01) |
| B64G 1/58 | (2006.01) |
| C09K 5/18 | (2006.01) |
| F16L 59/04 | (2006.01) |
| C08K 5/00 | (2006.01) |
| C08K 7/04 | (2006.01) |
| C08K 7/28 | (2006.01) |
| C08L 83/04 | (2006.01) |

(52) U.S. Cl.
CPC ... C09K 5/18 (2013.01); B64G 1/58 (2013.01); C08L 97/007 (2013.01); F16L 59/04 (2013.01); C08K 5/0058 (2013.01); C08K 7/04 (2013.01); C08K 7/28 (2013.01); C08L 61/06 (2013.01); C08L 83/04 (2013.01)

(58) Field of Classification Search
CPC ......... C08L 97/007; C08L 61/06; C08K 7/04; B64G 1/58
USPC .............................................. 524/16; 252/74
See application file for complete search history.

(56) References Cited

U.S. PATENT DOCUMENTS

| 2,087,942 A | | 7/1937 | West | |
| 3,914,392 A | * | 10/1975 | Klett | 423/445 R |
| 4,031,059 A | | 6/1977 | Strauss | |
| 4,112,179 A | * | 9/1978 | Maccalous et al. | 428/325 |
| 4,204,899 A | | 5/1980 | Walker et al. | |
| 4,330,442 A | * | 5/1982 | Lindeman et al. | 524/16 |
| 4,545,568 A | * | 10/1985 | Rothfuss et al. | 266/280 |
| 4,595,714 A | * | 6/1986 | McAllister et al. | 523/179 |
| 4,656,095 A | * | 4/1987 | McAllister et al. | 428/413 |
| 4,686,128 A | * | 8/1987 | Gentilman | 428/44 |
| 5,038,561 A | * | 8/1991 | Chase | 60/254 |
| 5,064,868 A | | 11/1991 | Simpson et al. | |
| 5,339,931 A | * | 8/1994 | Jacko et al. | 188/251 M |
| 5,579,998 A | * | 12/1996 | Hall et al. | 239/9 |
| 5,744,225 A | * | 4/1998 | Kujirai et al. | 428/212 |
| 6,450,450 B1 | * | 9/2002 | MacDonald et al. | 244/126 |
| 7,919,167 B1 | * | 4/2011 | Rawal et al. | 428/117 |
| 2001/0036505 A1 | | 11/2001 | Kirby et al. | |
| 2003/0022983 A1 | * | 1/2003 | Barney et al. | 524/588 |
| 2004/0102534 A1 | * | 5/2004 | Orpin | 521/56 |
| 2004/0241408 A1 | * | 12/2004 | Garrettson | 428/292.1 |
| 2005/0096414 A1 | | 5/2005 | Cosby et al. | |
| 2006/0160914 A1 | * | 7/2006 | Orpin | 521/186 |
| 2009/0054580 A1 | * | 2/2009 | Joachim et al. | 524/443 |
| 2009/0311471 A1 | * | 12/2009 | Tompkins et al. | 428/117 |
| 2013/0193366 A1 | * | 8/2013 | Plaindoux et al. | 252/62 |
| 2013/0207028 A1 | * | 8/2013 | Plaindoux et al. | 252/74 |

FOREIGN PATENT DOCUMENTS

| CH | 274859 A | | 4/1951 |
| EP | 1482163 A2 | | 12/2004 |
| EP | 1493788 A1 | | 1/2005 |
| GB | 879411 A | | 10/1961 |
| JP | 05024009 A | * | 2/1993 |
| WO | 2011014085 A2 | | 2/2011 |

OTHER PUBLICATIONS

Machine translatin of JP 0524009, 2014.*
International Search Report dated Aug. 17, 2011.
Reculusa et al: "Formation of low-density carbon materials through thermal degradation of a cork-based composite", Carbon, Elsevier, Oxford, GB, vol. 44, No. 7, Jun. 1, 2006, pp. 1316-1320, XP025010899, ISSN: 0008-6223, DOI: DOI:10.1016/J.CARBON. 2005.12.051 p. 1316, right-hand column, paragraph 2-p. 1320, left-hand column, paragraph 1.

* cited by examiner

Primary Examiner — Liam J Heincer
(74) Attorney, Agent, or Firm — Perman & Green, LLP

(57) ABSTRACT

A heat protection material for a surface, made of a mixture comprising a resin, cork granules and refractory fibers; the proportion of cork granules in the mixture is 50 to 80% by mass, wherein the corresponding proportion of refractory fibers in the mixture is 1 to 11% by mass.

14 Claims, 4 Drawing Sheets

HEAT-PROTECTION MATERIAL

CROSS-REFERENCE TO RELATED APPLICATIONS

This application is the National Stage of International Application No. PCT/EP2011/056271 International Filing date, 19 Apr. 2011, which designated the United States of America, and which International Application was published under PCT Article 21 (s) as WO Publication WO 2011/131694 A1 and which claims priority from, and benefit of, French Application No. 1053089 filed on 22 Apr. 2010, the disclosures of which are incorporated herein by reference in their entireties.

The disclosed embodiment relates to heat protection materials of the type used in the field of aerospace. These materials are designed to protect structures or equipment from very high heat loads, during short periods not exceeding a few minutes.

These materials are required during phases of going through the atmosphere of planets, both on launch and reentry.

They are also used as protection against the heat sources of launch or space vehicles, such as the propulsion units.

BACKGROUND

The natural heat insulation properties of cork, associated with a binding agent that resists high temperatures, makes its use possible in aerospace and military industries for such applications.

There are many realizations of heat protection materials; in particular: document US 2001/0036505 A1 concerns a porous composition comprising cork particles and a binding agent; document U.S. Pat. No. 4,204,899 concerns making an ablative heat protection material comprising finely divided cork and thermosetting resin; and document EP 1 493 788A1 describes an ablative heat protection material for entry into the atmosphere of a space vehicle comprising cork and silicone that can be projected onto a surface.

Document US2005/0096414 A1 describes a heat protection material comprising silicone resin, a silicone catalyst, cork, glass ecospheres and a silicone solvent, with 65.3 to 72.3 percent of silicone resin by mass.

One material used is also the material known under the EADS group's brand name NORCOAT.

This material comprises 100 parts by weight of 0.5 to 1 mm cork, 35 parts by weight of phenolic resin, a fungicide and a flame retardant.

SUMMARY

The objective of the disclosed embodiment is to optimize the performance by mass of existing materials used, in regards to high flow applications, up to 10 MW/m2, and to obtain markedly less dense materials than the materials currently used in this field.

Such intensive flows are found on the forward shields of space vehicles or as protection against propulsion flows.

In this context, the disclosed embodiment proposes a heat protection material for a surface, made of a mixture comprising a resin, cork granules and refractory fibers; the proportion of cork granules in the mixture is 50 to 80% by mass, for which the corresponding proportion of refractory fibers in the mixture is 1 to 11% by mass.

Advantageously, the proportion of cork granules is from 64 to 74%.

The resin is, in particular, a resin with high coke content, with a percentage by mass in the mixture of 10 to 30%.

Preferably, the percentage by mass of resin in the mixture is between 20 and 26%.

According to one particular embodiment, the resin is a phenolic resin.

According to a first embodiment, the percentage by mass of refractory fibers is between 9 and 11%.

According to an alternative embodiment, the percentage by mass of refractory fibers is between 1 and 4%.

The material advantageously comprises a 0.5 to 1.5% percentage by mass of fungicide.

Preferably, the cork is flame-proofed cork.

The composition of the material is advantageously designed for heat flows in the range 0.5 to 10 MW/m2.

Advantageously, its density after degassing is of the order of 0.35 to 0.41 and more precisely 0.38.

The refractory fibers are advantageously carbon fibers between 0.4 and 1.1 mm long.

In a variant, the refractory fibers are alumina fibers of comparable length.

BRIEF DESCRIPTION OF THE DRAWINGS

Other features and advantages of the disclosed embodiment will become apparent in reading the following description of a non-limiting example of realization of the disclosed embodiment with drawings, which show.

DETAILED DESCRIPTION

Figure 1:
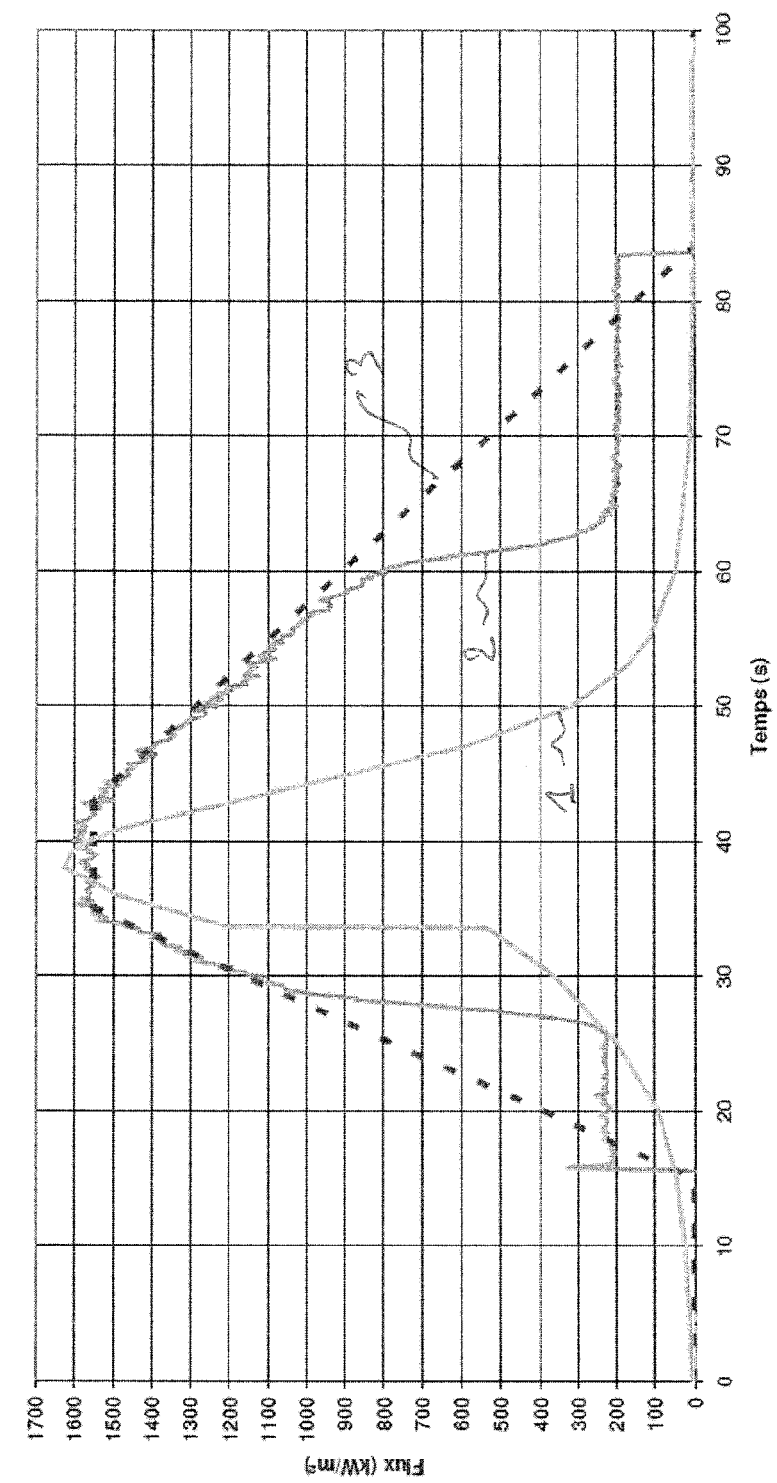
in FIG. 1: a graph representing a simulation of an atmospheric reentry mission.

The heat protection materials used in the context of aerospace missions are exposed to large heat load during short periods of time.

Materials to be projected onto the surfaces to be protected and sheet materials both exist; the disclosed embodiment concern the sheet materials.

Because of their operating principle, these materials, particularly those that comprise cork, cannot be characterized according to criteria such as heat conductivity, heat capacity and diffusivity.

In addition, it is not possible to define a temperature to which they will be subjected; however, their conditions of use can be characterized by a law that expresses the heat flow applied as a function of time.

When subjected to a heat flow caused by the friction of an atmosphere, heat protection materials react in transient fashion: they heat up by heat conduction and radiation, transmit the heat with their diffusivity and decompose.

Their surface that is exposed to the flow can also wear away little by little.

This last behavior, called "ablative", is fundamental for this type of materials because it helps to reduce the incoming heat flow.

The behavior of materials during this ablation must be such that the material that decomposes leaves a residue, called "crust", which remains in place at the surface of the material.

This crust must remain in place despite the mechanical loads to which the material may be subjected, in particular vibrations and aerodynamic friction, also, particularly so as not to alter the aerodynamic profile of the object during its atmospheric travel, this crust must be uniform and have the least possible number of cracks; and the formation of this crust must occur with the smallest possible reduction in the surface area of the material, to preserve the material's insulating properties.

To optimize the materials and get the appropriate behavior from them, many parameters can be altered, with the aim of obtaining the smallest possible increase in temperature on the cold side of the material at the end of the space vehicle's mission, for the lowest possible protective mass.

One important optimization criterion for heat protection materials is their mass, because optimizing technical solutions in terms of their mass is an ever-present objective when building space vehicles or aircraft.

In effect, any mass gains on the structure allow either a larger payload or a reduction in the mass of propellant to be carried and possibly allow reducing the mass of the support structure.

The effect of reducing the mass are not just technical, they are also financial. It is already very important to reduce the mass of the vehicle on a launcher; it becomes even more so for a space probe that has to return to a planet after a journey in space.

Missions that require heat protection are characterized in terms of heat flow, of duration of temperature stress and also in terms of heat load, which corresponds to the total flow accumulated in the course of the mission.

The materials concerned by the disclosed embodiment are those destined to be used in high flux applications.

The high flux applications concerned are applications with heat flows of up to 10 MW/m2 approximately, and a total heat load of less than 100 MJ/m2.

Such intense flows are found on the forward shields of such vehicles or as protection against propulsion flows.

To realize a protective material, the following data are utilized:

the desired proportion of cork by mass is 50-80%, with a preferred value of between 65 and 70%;

the proportion of refractory fibers by mass is in the 1-11% range with one preferred value around 10% and another between 1 and 5%;

the refractory fibers used here are T300-type carbon fibers with 6,000 filaments from Toray.

These fibers are crushed to shorten them to a length of between 0.5 and 4 mm, thus making them short fibers.

They were selected for their refractory nature, i.e. their ability to support high temperatures of, say, above 1,000 or 1,500° C.

In addition to carbon fibers, other fibers can be used, e.g. Alumina fibers.

Suitable resins are resins with high coke content, i.e. the amount of carbon obtained when they are heated to 1,000° C. in an inert atmosphere such as nitrogen.

This measurement is performed with a traditional thermal analysis device, able to withstand 1,000° C. in nitrogen.

The desired coke content is above 50%; it is generally obtained with resins that have aromatic cycles, such as phenolic, but also furan, bitumen and others.

Phenolic resins are a specific case, implemented in the example.

The proportion of resin is between 10 and 30% by mass and preferably between 20 and 25% by mass.

The planned fungicide content ranges between 0.5 and 1.5%.

Materials called HD1, HD2 and HD2-LC have been tested to compare them.

The desired density of these materials was 415+/−5 kg/m3.

Material HD1 was realized with silicone resin, materials HD2 and HD2-LC with phenolic resin, material HD2-LC also had a lower proportion of short carbon fibers.

The dimensions of the test sheets were 110×160×20 mm; their composition is given in the table below, in which the cells marked X indicate the absence of an ingredient.

The characteristics of these samples are summarized in the tables below.

| Ingredients | HD1 (% by mass) | HD2 (% by mass) | HD2-LC (% by mass) |
| --- | --- | --- | --- |
| Phenolic resin | X | 21-24 | 23-25 |
| Silicone resin RTV 615 | 23-26 | X | X |
| Catalyst 615 | 2-3 | X | X |
| Flame-proof cork | 45-48 | 65-68 | 70-73 |
| Silica microspheres | 12-14 | X | X |
| Short carbon fibers | 12-14 | 9-11 | 1-3 |
| Fungicide | 0.5-0.7 | 0.8-0.9 | 0.8-1 |

| | Polymerization temperature | | |
| --- | --- | --- | --- |
| | 125° C. | 125° C. | 125 |
| Polymerization time | 4 h | 12 h | 12 h |

As stated above, the objective of the disclosed embodiment is to optimize the performance by mass of existing materials used, in regards to a high flow application, up to 10 MW/m2, and to obtain markedly less dense materials than the materials currently used in this field.

To test these materials, an atmospheric reentry is simulated by applying a heat flow to the specimens.

An example of an atmospheric reentry simulation on the front of a space vehicle is shown in FIG. 1.

This type of mission is for reentry on the planet Mars of a vehicle with the traditional stable aerodynamic shape (Apollo capsule type).

The curve labeled 1 is the set point corresponding to the mission requirement and the curve labeled 2 represents the test performed.

The dotted curve labeled 3 is the acceptable envelope for the test.

The results obtained by the materials tested according to this mission simulation are represented as curves that describe the temperature at a given depth in the material over time. In general, the lower the curve, the better the behavior is.

Figure 2:
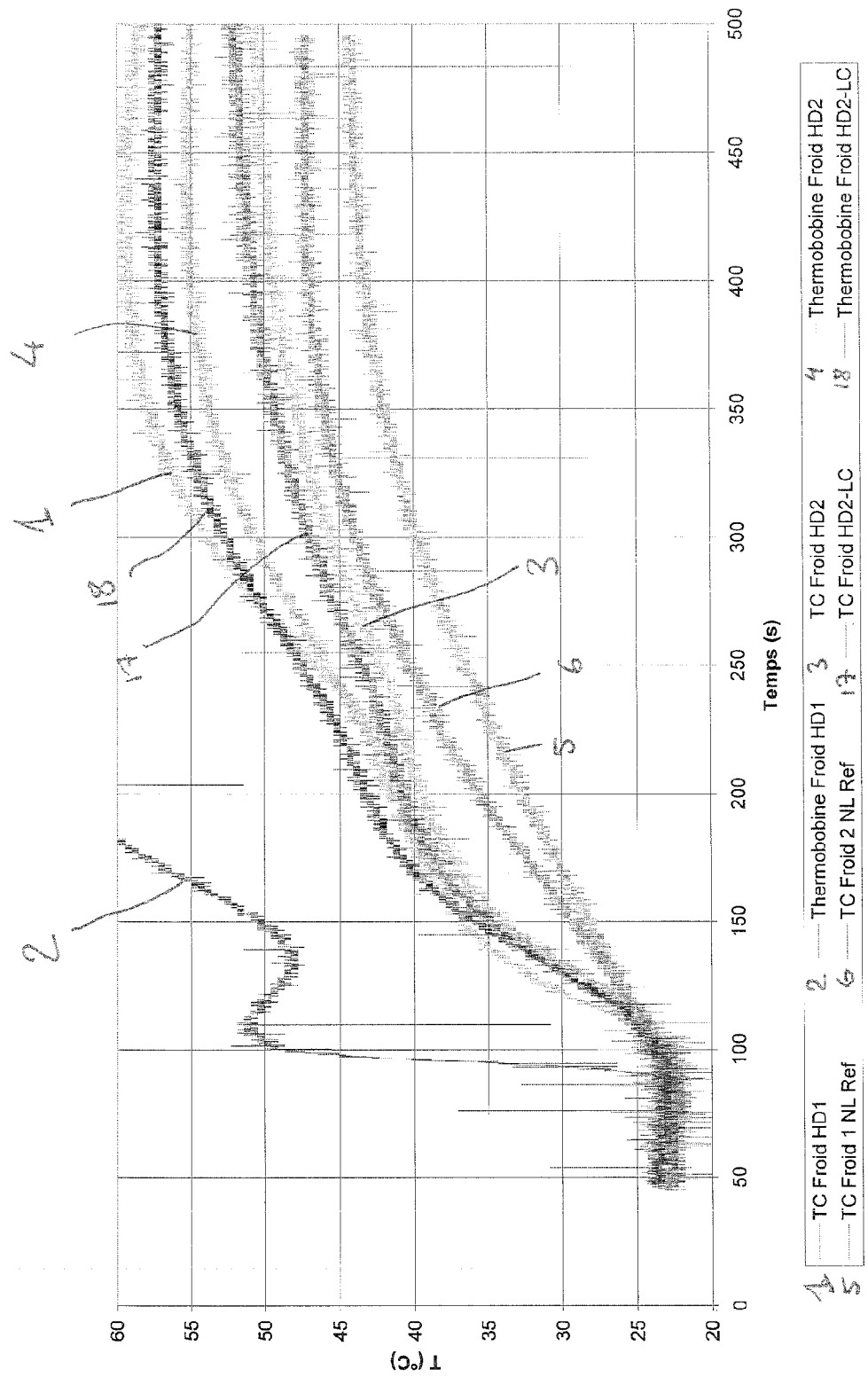
in FIG. 2: a graph representing the transparency curves of various materials subjected to the simulation in FIG. 1.

FIG. 2 is a comparison of the temperatures obtained on the cold wall of the materials, i.e. on the surface of the structure to be protected.

For HD1, the curve labeled 1 represents the temperature measurement at the cold wall of the material, which wall is in contact with the surface to be protected; reference curve 2 is the temperature at the thermo-coil, i.e. a small disk of materials in which thermocouples have been implanted in various places within the depth of the material.

These disks, implanted within the specimens, correspond to the circular portion at the center of the sample.

For the HD2 material, the curve labeled 3 is the measurement of the temperature at the cold wall of a first sample; the curve labeled 4 is the measurement of the temperature at the cold level of the thermo-coil.

For the NORCOAT CORK material, curves 5 and 6 are temperature measurements of two specimens at two different places on the cold wall.

Lastly, the HD2-LC material has the curves labeled 17 and 18 at the cold wall and at the thermo-coil, respectively.

These curves remain within the average of the other materials.

The results given previously are for the same thickness, however, which does not match the stated objective of optimizing the mass.

To take this objective into account, the results must be restated and presented for an equal mass.

Figure 3:
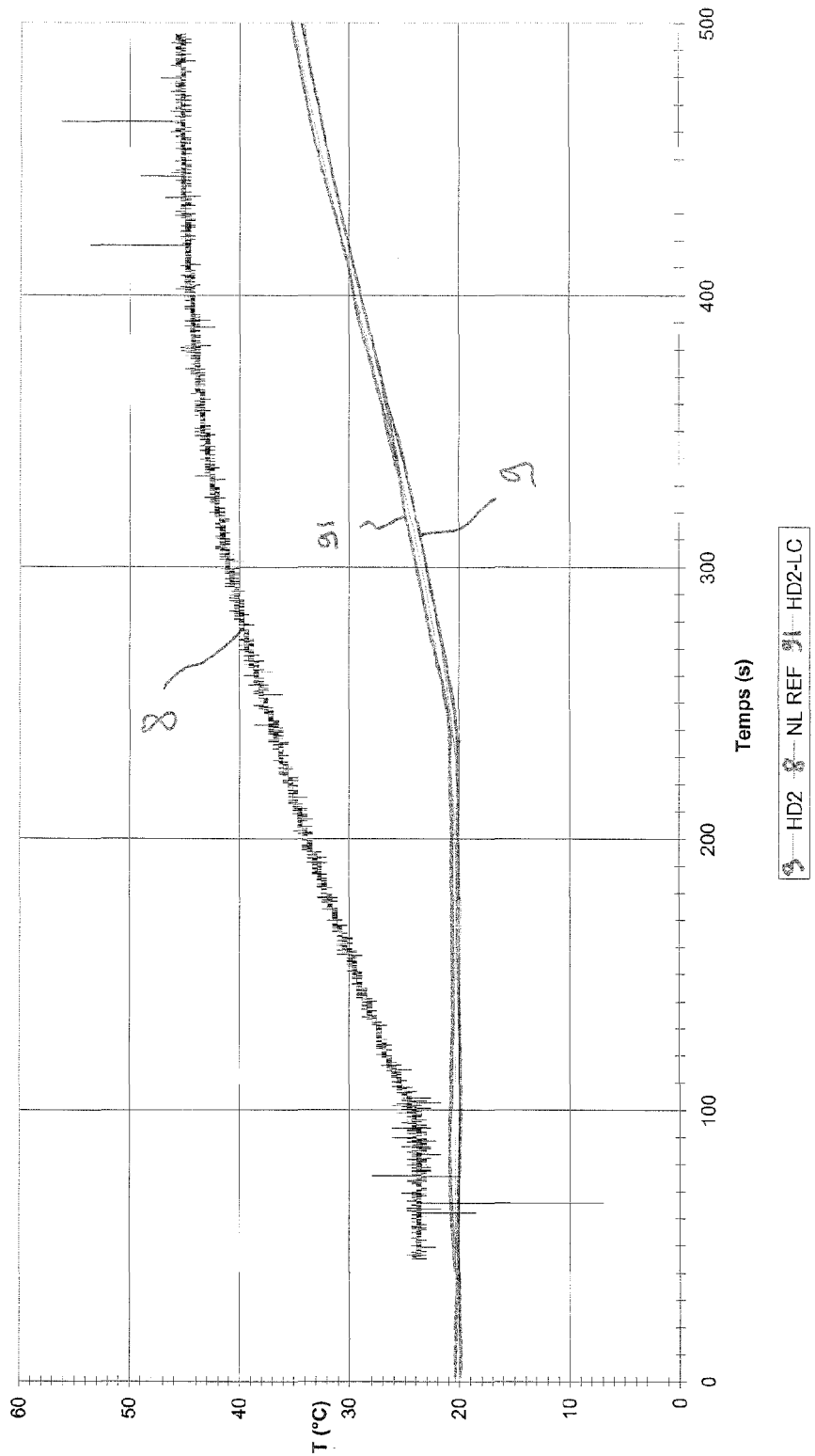
in FIG. 3: a graph showing the measured data, scaled to the same mass.

This is what FIG. 3 represents: the cold wall temperatures for the HD2 and HD2-LC materials are compared with the NORCOAT CORK (NC) reference material for an equal mass, i.e. by setting the mass of the tested material to the mass of the reference material.

According to the legend of FIG. 8, curve 8 is the reference material, curve 9 is the same-mass measurement correction for the HD2 material and curve 91 is the same-mass measurement correction for the HD2-LC material.

This shows that for the same mass, the performance of the heat shield made of the new material is far higher than that of the heat shield made of the reference material.

The curve 9 for the HD2 material and the curve 91 for the HD2-LC material for the same surface mass clearly show that the performance of these materials is higher than that of the reference NC material.

Figure 4:
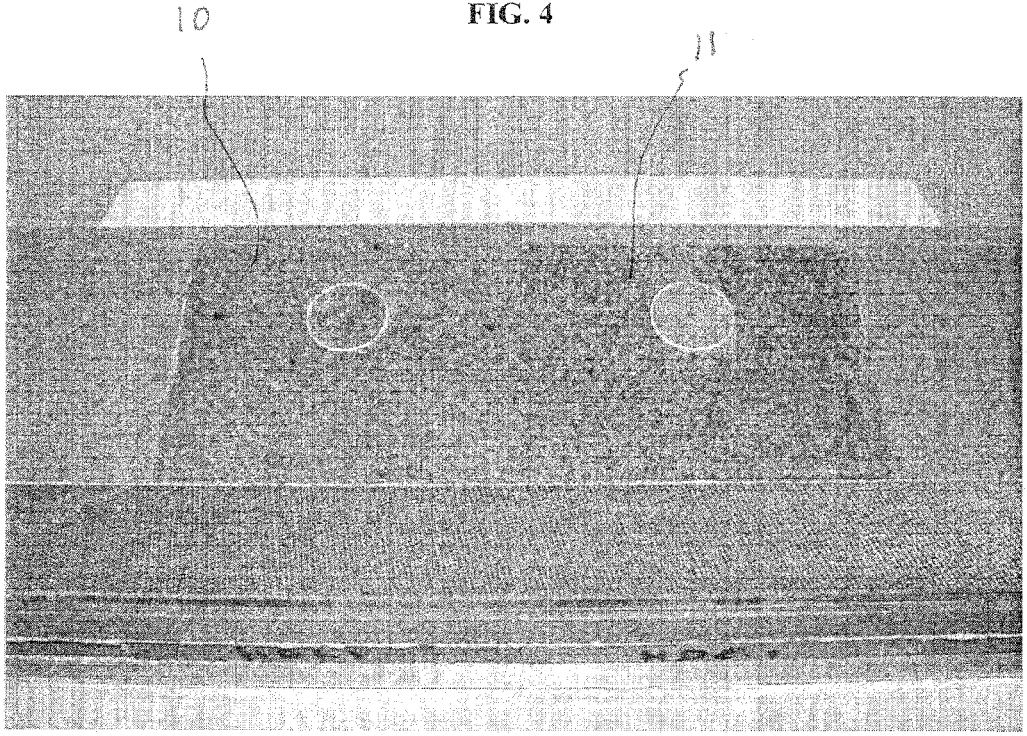
in FIG. 4: a photo of two samples of materials seen before the simulation in FIG. 1.
Figure 5:
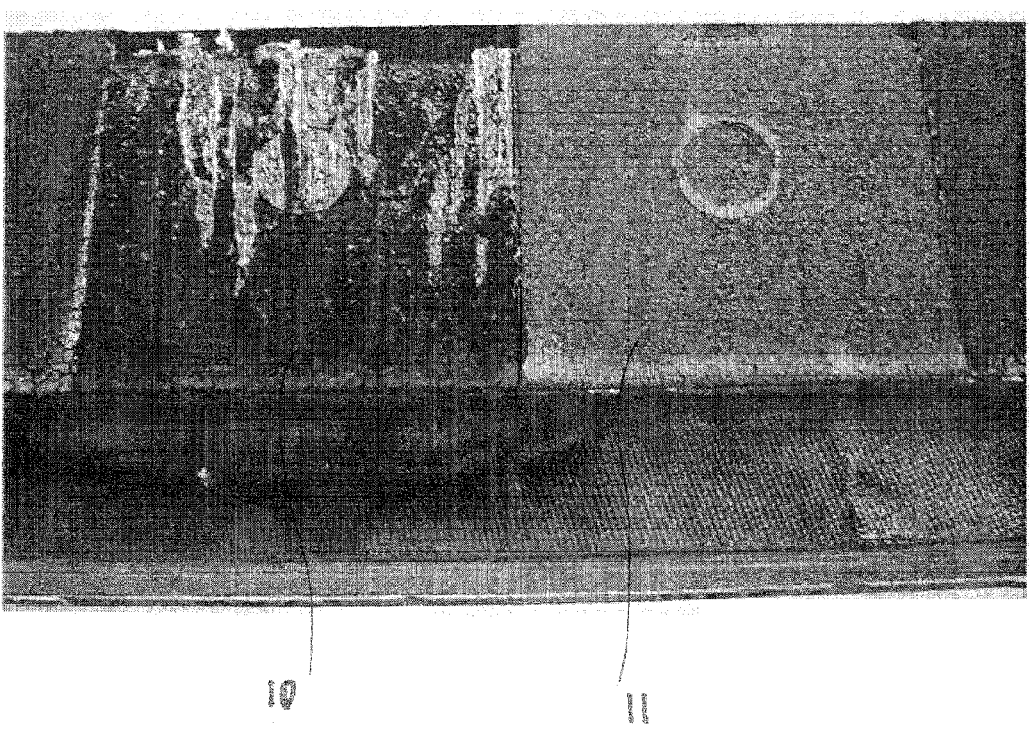
in FIG. 5: the materials in FIG. 4 after the simulation in FIG. 1.

FIGS. 4 and 5 show views of specimens for HD1, labeled 10, and HD2, labeled 11, before and after the mission simulation, respectively.

As can be seen in FIG. 5 the HD1 material labeled 10 is badly degraded: some matter was ejected abruptly. This is probably due to the presence of silicone resin in the material and to the general heterogeneity of the specimen. Ablation was very low in the sound areas.

The state of the HD2 material's surface, labeled 11, is very clean. Since ablation is generally less with a lower density material, this is considered a good result.

In addition, taking ablation into account also shows a very clear improvement in the HD2 material's behavior, in comparison with the prior state of the art: less ablation, meaning less loss of mass in operation and therefore less initial mass to be carried.

The density, conductivity and diffusivity of the materials are summarized in the table below:

|  | HD1 | HD2 | HD2-LC | Prior art (Norcoat) |
|---|---|---|---|---|
| Density (material not degassed) | 0.41 (0.40-0.42) | 0.41 (0.40-0.42) | 0.41 (0.40-0.42) | 0.47 |
| Density (degassed material) | 0.38 (0.37-0.39) | 0.38 (0.37-0.39) | 0.38 (0.37-0.39) | 0.45 |
| Conductivity 20° C. (W/m. ° C.) | 0.15 | 0.15 | 0.15 | 0.1 |
| Diffusivity 20° C. 10-6 m2/s | 0.18 | 0.14 | 0.14 | 0.083 |

According to this table, the HD1, HD2 and HD2-LC materials are very similar and their densities are close to but slightly lower than that of the known NORCOAT CORK product. The heat conductivity and diffusivity at 20° C. of this last are lower however, which should make this material more insulating.

The density of the materials depends on their pressing in the mold used to manufacture them.

The desired density is between 0.35 and 0.41.

Two test samples of the first material using silicone resin, called HD1-1 and HD1-2, were realized and tested.

The ambient conditions were: temperature 20° C.; humidity 56%.

The materials used comprise a 150×150 mm laboratory mold, i.e. 378.7 cc, an 8-liter capacity Kenwood kneader-mixer, a 50-250° C. electric drying oven and 3 Kg Viper electronic scales by Mettler.

The objective was to realize samples with a density of 415+/−5 kg/m3 and a mass of 157.2 g.

The ingredients used to make the test material HG1 are described in the table below:

| Ingredients: | Supplier | PCM | Weight g |
|---|---|---|---|
| Flame-proofed 0.5/1 mm cork granules | Amorim-HPK | 46.71 | 73.43 |
| Silicone RTV 615 | Bayer | 24.45 | 38.44 |
| RTV catalyst | Bayer | 2.45 | 3.85 |
| SI 200 microspheres | Trelleborg | 12.91 | 20.3 |
| Carbon fibers | Apply-carbon | 12.91 | 20.3 |
| Fungicide | Borcher's | 0.57 | 0.9 |

The operating procedure for realizing the first sample, called HD1-1, is described in the table below:

| Operating procedure: | HD1-1 |
|---|---|
| Weighing the ingredients | 15 mins |
| Mixing the microspheres with carbon | 5 mins |
| Mix RTV and catalyst in the mixer bowl | 1.5 min |
| Add 16 g cork and mix for 30 seconds at speed 1 | 30 secs |
| Retrieve the resin from the bottom of the bowl. | 30 secs |
| Add and mix in the remaining cork | 5 mins |
| Blend in the SiO2-carbon mixture at speed 1 | 4 mins |
| Homogenize at speed 2 | 1 min |
| Fill the mold with the mixture | 30 secs |
| Compress until the mold is closed | 30 secs |
| Place the mold in the drying oven and keep at 120° C. | 2 hrs 5 mins |
| Cool the mold at room temperature | 2 hrs |
| De-mold and check the sample | 5 mins |

The only difference for the HD1-2 material is the drying time of 2 hrs 15 mins at 120° C.

The appearance of the HD1-1 and HD1-2 samples obtained is uniform; their de-molded mass is 153.5 and 155.2 g respectively; their final mass is 154.4 and 155.5 g respectively, which shows an increase in mass after de-molding.

Similarly, two test samples of the second material using phenolic resin, called HD2-1 and HD2-2, were realized and tested.

The ambient conditions were: temperature 20° C.; humidity 56%.

The materials used comprise a 150×150 mm laboratory mold, i.e. 378.7 cc, an 8-liter capacity Kenwood kneader-mixer, a 50-250° C. electric drying oven and 3 Kg Viper electronic scales by Mettler.

The objective was to realize samples with a density of 415+/−5 kg/m3 and a mass of 157.2 g.

The ingredients used to make the test material HD2 are described in the following table:

| Ingredients: | Supplier | PCM | Weight g |
|---|---|---|---|
| Flame-proofed 0.5/1 mm cork granules | Amorim-HPK | 66.71 | 104.9 |
| Phenolic resin | Exxon | 22.71 | 35.7 |
| Carbon fibers | Apply-carbon | 9.74 | 15.3 |
| Fungicide | Borcher's | 0.84 | 1.32 |

The operating procedure for realizing the first sample, called HD2-1, is described in the table below:

| Operating procedure | HD2-1 |
|---|---|
| Weighing the ingredients | 15 mins |
| Mix the resin and fungicide in the mixer bowl | 1 min |
| Add 16 g cork and mix for 30 seconds at speed 1. | 30 secs |
| Retrieve the resin from the bottom of the bowl | 30 secs |
| Add and mix in the remaining cork | 5 mins |
| Blend in the carbon fibers very slowly, speed 1. | 4 mins |
| Homogenize at speed 2 | 1 min |
| Fill the mold with the mixture | 30 secs |
| Compress until the mold is closed | 30 secs |
| Heat the mold in the drying oven at 120° C. | 2 hrs |
| Cool the mold at room temperature | 2 hrs |
| De-mold and check the sample | 5 mins |

The only difference between samples HD2-2 and HD2-1 is the heating time of 2 hrs 40 mins.

After realization, the appearance of the material HD2 is very uniform, the mass of the samples HD2-1 and HD2-2 is 150.3 and 148.8 g respectively, with a final mass of 150.0 and 148.8 g, which corresponds to a slight loss of mass in drying.

The material HD2-LC is realized with the following ingredients:

| Ingredients: | Supplier | PCM | Weight g |
|---|---|---|---|
| Flame-proofed 0.5/1 mm cork granules | Amorim-HPK | 72.3 | 107.7 |
| Phenolic resin | Exxon | 24.4 | 36.4 |
| Carbon fibers | Apply-carbon | 2.4 | 3.6 |
| Fungicide | Borcher's | 0.9 | 1.3 |

The operating procedure is the same as for material HD2 and the final masses are 149 and 151.2.

To qualify the material, the ablation of the material must be taken into consideration.

The results also show a very clear improvement in the HD2 material's behavior in comparison with the prior art: less ablation, meaning less loss of mass in operation and therefore less initial mass to be carried.

The HD2 material, which has low ablation and allows, for the same mass, the time for reaching the temperature of 30° C. to be tripled compared with the previous material (450 seconds instead of 150 seconds), appears to be well suited for high maximum heat flow, in the range going up to 5 to 10 MW/m2, even though the tests performed were limited to 2 Mw/m2.

The material of the prior art, which is apparently a better heat insulator, is therefore actually less efficient than the HD2 material, which appears to be well suited to the envisaged application.

Similarly, the behavior of the HD2-LC material is satisfactory both for temperature and ablation.

Over and beyond the initial application of realizing heat protection for space vehicles, the disclosed embodiment can find numerous other applications as heat protection in the fields of rail, sea, air and ground transportation, in the field of industry, such as machinery, in the field of construction, such as fire-retardant protection.

The invention claimed is:

1. A heat protection ablative material for protecting a surface of a space vehicle from heat, having a mixture comprising a phenolic resin with a content of coke above 50% when heated to 1,000° C. in an inert atmosphere such as nitrogen, cork granules and refractory fibers, in which the proportion of cork granules in the mixture is a percentage from 70 to 73% by mass, wherein the percentage by mass in the mixture of refractory fibers is between 1 and 3% while the percentage by mass in the mixture of resin is the range of 23-25% and the material being so designed to withstand heat flows ranging from 0.5 to 10 MW/m2, and the material contains no microspheres.

2. Heat protection material according to claim 1, comprising 0.5 to 1.5% percentage by mass of fungicide.

3. Heat protection material according to claim 1, wherein the cork is flame-proofed cork.

4. Heat protection material according to claim 1, comprising a density between 0.35 and 0.41 kg/L after degassing.

5. Heat protection material according to claim 1, comprising a density of 0.38 kg/L after degassing.

6. Heat protection material according to claim 1, wherein the refractory fibers are carbon fibers between 0.4 and 4 mm long.

7. Heat protection material according to claim 1, wherein the refractory fibers are alumina fibers between 0.4 and 4 mm long.

8. A heat protection ablative material for protecting a surface of a space vehicle from heat, having a mixture comprising a phenolic resin with a content of coke above 50% when heated to 1,000° C. in an inert atmosphere such as nitrogen, cork granules and refractory fibers, in which the proportion of cork granules in the mixture is a percentage from 65 to 68% by mass, wherein the percentage by mass in the mixture of refractory fibers is between is between 9 and 11% while the percentage by mass in the mixture of resin is the range of 21-24% the material being so designed to withstand heat flows ranging from 0.5 to 10 MW/m2, the material containing no microspheres.

9. Heat protection material according to claim 8, comprising 0.5 to 1.5% percentage by mass of fungicide.

10. Heat protection material according to claim 8, wherein the cork is flame-proofed cork.

11. Heat protection material according to claim 8, comprising a density between 0.35 and 0.41 kg/L after degassing.

12. Heat protection material according to any claim 8, comprising a density of 0.38 kg/L after degassing.

13. Heat protection material according to claim 8, wherein the refractory fibers are carbon fibers between 0.4 and 4 mm long.

14. Heat protection material according to claim 8, wherein the refractory fibers are alumina fibers between 0.4 and 4 mm long.

* * * * *